United States Patent
Smirnov et al.

(10) Patent No.: US 8,484,669 B2
(45) Date of Patent: Jul. 9, 2013

(54) MOTOR AND OPTICAL DISC DRIVE USING THE SAME

(75) Inventors: Viatcheslav Smirnov, Gyunggi-do (KR); Kyung Su Park, Gyunggi-do (KR); Jae Yoon Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 61 days.

(21) Appl. No.: 12/926,776

(22) Filed: Dec. 8, 2010

(65) Prior Publication Data
US 2012/0017225 A1 Jan. 19, 2012

(30) Foreign Application Priority Data
Jul. 16, 2010 (KR) .................. 10-2010-0069190

(51) Int. Cl.
G11B 17/03 (2006.01)
G11B 17/028 (2006.01)
G11B 19/20 (2006.01)
H02K 5/00 (2006.01)
F16C 33/02 (2006.01)

(52) U.S. Cl.
USPC .............................. 720/697; 384/295; 310/91

(58) Field of Classification Search
USPC ................. 720/695–699; 310/67 R, 90, 91, 310/107, 418, 422; 384/295, 296, 537–539, 384/107; 360/98.07, 99.08
See application file for complete search history.

(56) References Cited

U.S. PATENT DOCUMENTS

| | | | | |
|---|---|---|---|---|
| 5,562,347 A * | 10/1996 | Hsieh | | 384/215 |
| 6,097,121 A * | 8/2000 | Oku | | 310/91 |
| 6,250,810 B1 * | 6/2001 | Chang et al. | | 384/428 |
| 6,256,288 B1 * | 7/2001 | Yamauchi et al. | | 720/698 |
| 6,661,131 B2 | 12/2003 | Fukutani | | |
| 6,734,591 B2 * | 5/2004 | Obara et al. | | 310/90 |
| 7,638,912 B2 * | 12/2009 | Nishikata et al. | | 310/90 |
| 8,207,655 B2 * | 6/2012 | Jung | | 310/425 |
| 2003/0020341 A1 * | 1/2003 | Nagatsuka | | 310/67 R |
| 2005/0081226 A1 * | 4/2005 | Torii | | 720/697 |

(Continued)

FOREIGN PATENT DOCUMENTS

| | | |
|---|---|---|
| JP | 2004-263390 | 9/2004 |
| KR | 10-0539304 | 12/2005 |
| KR | 10-0726399 | 6/2007 |
| KR | 10-2008-0097293 | 11/2008 |

OTHER PUBLICATIONS

Korean Office Action issued May 13, 2011 in corresponding Korean Patent Application 10-2010-0069190.

*Primary Examiner* — Wayne Young
*Assistant Examiner* — Adam B Dravininkas

(57) ABSTRACT

A motor in which a coupling structure between a sleeve holder and a base plate is improved. The motor may include a base plate including at least one protrusion supporting part formed therein; and a sleeve holder including a cylindrical shaped body part to which a sleeve is fastened in an inside of the sleeve holder, an extension part protruded such that an outer diameter is extended along an outer circumferential surface of the body part, and a flange part vertically protruded in an outer diameter direction from a lower end portion of the extension part so as to make surface contact with an upper surface of the base plate, where the sleeve holder is fastened to the base plate while an outer circumferential surface of the protrusion supporting part is brought into contact with an inner circumferential surface of the extension part.

14 Claims, 8 Drawing Sheets

U.S. PATENT DOCUMENTS

| | | |
|---|---|---|
| 2005/0210490 A1* | 9/2005 | Shimizu et al. ............... 720/697 |
| 2006/0006746 A1* | 1/2006 | Nishikata et al. ........... 310/67 R |
| 2006/0085807 A1* | 4/2006 | Nishidate ...................... 720/697 |
| 2007/0007836 A1 | 1/2007 | Hyun |
| 2007/0065064 A1* | 3/2007 | Kitamura et al. ............. 384/537 |
| 2007/0076990 A1* | 4/2007 | Tsai et al. ..................... 384/100 |
| 2007/0274002 A1* | 11/2007 | Kim et al. .................. 360/99.08 |
| 2008/0179978 A1* | 7/2008 | Ichizaki ......................... 310/89 |
| 2008/0278027 A1* | 11/2008 | Ikemoto et al. ............... 310/254 |
| 2010/0141070 A1* | 6/2010 | Brown ............................ 310/90 |

* cited by examiner

MOTOR AND OPTICAL DISC DRIVE USING THE SAME

CROSS-REFERENCE TO RELATED APPLICATIONS

This application claims the priority of Korean Patent Application No. 10-2010-0069190 filed on Jul. 16, 2010, in the Korean Intellectual Property Office, the disclosure of which is incorporated herein by reference.

BACKGROUND OF THE INVENTION

1. Field of the Invention

The present invention relates to a motor and an optical disc drive using the same, and more particularly, to a motor in which a coupling structure between a sleeve holder and a base plate is improved, and to an optical disc drive using the same.

2. Description of the Related Art

In general, a spindle motor installed in an optical disc drive may function to rotate a disc so that an optical pick-up device may read data recorded on the disc.

A conventional spindle motor may be fixed to a base plate in such a manner that a circuit board is displaced on a base plate, and a sleeve holder is inserted into a hole formed in a center portion of the base plate. In addition, a separate supporting plate may be fastened to a lower surface of the sleeve holder.

The above described conventional sleeve holder may be formed through cutting work, and relatively expensive brass may be used as the material of the sleeve holder. Accordingly, due to the relatively expensive brass, the conventional motor may have disadvantageously high manufacturing costs.

SUMMARY OF THE INVENTION

An aspect of the present invention provides a motor in which a coupling structure between a base plate and a sleeve holder may be improved, thereby simplifying a structure of the motor, and reducing manufacturing costs and manufacturing process, and provides an optical disc drive using the same.

According to an aspect of the present invention, there is provided a motor, including: a base plate including at least one protrusion supporting part formed therein; and a sleeve holder including a cylindrical shaped body part to which a sleeve is fastened in an inside of the sleeve holder, an extension part protruded such that an outer diameter is extended along an outer circumferential surface of the body part, and a flange part horizontally protruded in an outer diameter direction from a lower end portion of the extension part so as to make a surface contact with an upper surface of the base plate. Here, the sleeve holder may be fastened to the base plate while an outer circumferential surface of the protrusion supporting part is brought into contact with an inner circumferential surface of the extension part.

The sleeve holder may include a stator seating part horizontally extended in the outer diameter direction from the outer circumferential surface of the body part by the extension part.

The sleeve holder may be fastened to the base plate while a top surface of the protrusion supporting part is brought into contact with an inner surface of the stator seating part.

The protrusion supporting part may be protruded from the base plate to have an annular shape corresponding to the inner circumferential surface of the extension part.

The motor may further include: the cylindrial shaped sleeve fastened to an inside of the sleeve holder; a shaft rotatably inserted into the sleeve; and a thrust plate supporting a lower end portion of the shaft. Here, the thrust plate may be received in a recess shaped receiving part formed by the protusion supporting part of the base plate.

The motor may further include a stopper ring formed to have a ring shape, and interposed between the sleeve and the protrusion supporting part to prevent the shaft from being lifted.

The receiving part may include: a stepped part horizontally protruded from a side wall of the receiving part in a direction in which an outer diameter is reduced; and a thrust groove formed in a center portion of the stepped part to have a recess shape having a size corresponding to the thrust plate. Here, the thrust plate may be received in the thrust groove.

The motor may further include a stopper ring formed to have a ring shape, and interposed between the sleeve and the stepped part to prevent the shaft from being lifted.

A vertical distance from the top surface of the protrusion supporting part to a top surface of the stepped part may be a distance corresponding to a thickness of the stopper ring.

The flange part may include at least one protrusion part protruded downwardly from a lower surface of the flange part facing the base plate, the base plate may include at least one insersion hole formed to be positioned to correspond to the protrusion part, and the sleeve holder and the base plate may be fixedly fastened to each other in such a manner that the protrusion part is inserted into the insersion hole.

The protrusion part may be formed through burring work or pressing work.

The sleeve holder may include an expansion part formed such that an end of the protrusion part is curved in the outer diameter direction to support a lower surface of the base plate.

The sleeve holder and the base plate may be fastened to each other using at least one fastening scheme of press fitting, bonding, and welding.

The motor may further include a fixing member passing through both the flange part and the base plate to enable the sleeve holder and the base plate to be fixedly fastened to each other.

The fixing member may be a screw or a rivet.

The sleeve holder and the base plate may be manufactured by pressing work or injection molding.

According to another aspect of the present invention, there is provided a motor, including: a bearing assembly supporting a shaft to be rotatable; a stator including a core brought into contact with an outer circumferential surface of the bearing assembly and extended in an outer diameter direction, and a winding coil wound around the core; a rotor press-fitted to and fixed to the shaft in such a manner to receive the stator; and a base plate including at least one protrusion supporting part formed on an upper surface thereof, and fixedly fastened to the bearing assembly in such a manner that the protrusion supporting part is inserted into the bearing assembly.

The bearing assembly may include: a sleeve into which the shaft is rotatably inserted; and a sleeve holder including a cylindrical shaped body part to which the sleeve is fastened therein, an extension part protruded such that an outer diameter is extended along an outer circumferential surface of the body part, and a flange part horizontally protruded in an outer diameter direction from a lower end portion of the extension part so as to make a surface contact with an upper surface of the base plate, and the sleeve holder and the base plate may be fastened to each other in such a manner that the protrusion supporting part of the base plate is inserted into the extension part of the sleeve holder.

According to another aspect of the present invention, there is provided an optical disc drive, including: any one of the above motors; and an optical pick-up device movably installed in a lower space of a disc loaded in the motor, and adapted for receiving data from the disc.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
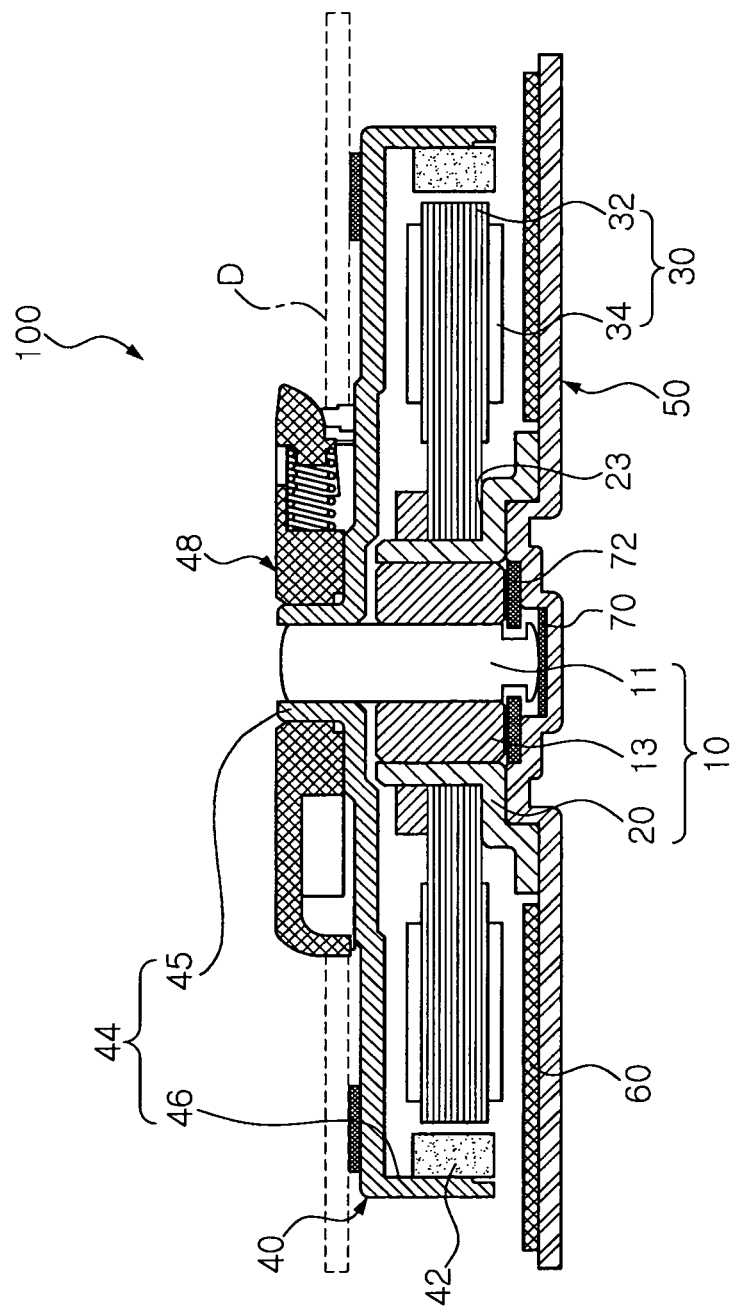
FIG. 1 is a schematic cross-sectional view showing a motor according to an exemplary embodiment of the present invention.

Before describing the detailed description of the present invention, the terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept implied by the term to best describe the method he or she knows for carrying out the invention. Therefore, the exemplary embodiments detailed in the detailed description and the configurations in the drawings are merely exemplary embodiments of the present invention and do not represent all of the technical ideas of the present invention. Therefore, it should be understood that there may be various equivalents and modifications capable of replacing them at the time of filing.

Hereinafter, exemplary embodiments of the present invention will be described in detail with reference to the accompanying drawings. Like reference numerals in the drawings denote like elements throughout the specification. In addition, in describing the present invention, a detailed description of related known functions or configurations will be omitted so as not to obscure the subject of the present invention. For the same reason, in the drawings, some components are exaggerated or omitted or are schematically illustrated, and the size of each component may not accurately reflect the actual size thereof.

Meanwhile, terms relating to the directions will be defined as follows. As shown in FIG. 1, an axial direction may denote a vertical direction with respect to a shaft 11, and outer and inner diameter directions may denote an outside edge direction of a rotor 40 with respect to the shaft 11 or a central direction of the shaft 11 with respect to the outside edge of the rotor 40.

Exemplary embodiments of the present invention will now be described in detail with reference to the accompanying drawings.

Figure 2:
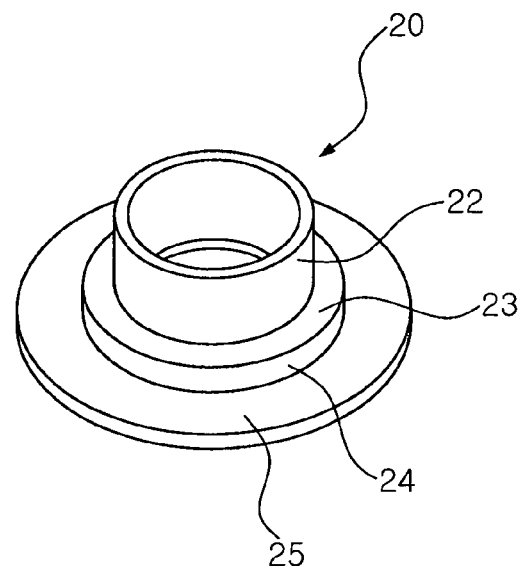
FIG. 2 is a perspective view showing a sleeve holder of FIG. 1.
Figure 3:
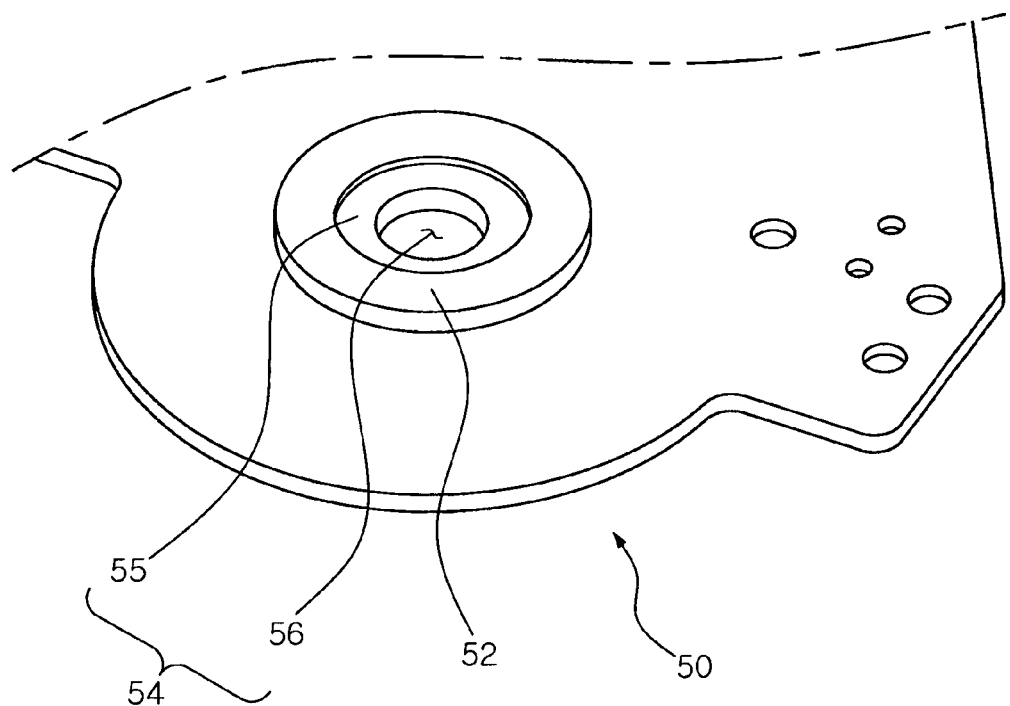
FIG. 3 is a perspective view showing a base plate of FIG. 1.

FIG. 1 is a schematic cross-sectional view showing a motor according to an exemplary embodiment of the present invention, FIG. 2 is a perspective view showing a sleeve holder of FIG. 1, and FIG. 3 is a perspective view showing a base plate of FIG. 1.

Referring to FIGS. 1 to 3, a motor 100 according to the present exemplary embodiment may be a spindle motor provided in an optical disc drive rotating a disc (D), and include a stator 30, a rotor 40, a bearing assembly 10, a base plate 50, and a circuit board 60.

The stator 30 may be a fixed structure that is configured to include a core 32 and a winding coil 34 wound around the core 32.

The core 32 according to the present exemplary embodiment may be formed of a plurality of iron plates laminated to one another, and may be radially extended in an outer diameter direction of the shaft 11 with respect to the shaft 11. The core 32 may be seated on a stator seating part 23 of a sleeve holder 20, which will be described later, and may be fixedly fastened to the sleeve holder 20.

The winding coil 34 may be a coil wound around the core 32, and generate an electromagnetic force when power is applied. The winding coil 34 according to the present exemplary embodiment may be electrically connected to the circuit board 60, so that the power may be supplied from the circuit board 60.

The rotor 40 may include a magnet 42 and a rotor case 44.

The magnet 42 may be an annular ring-shaped permanent magnet that generates a magnetic force of a predetermined intensity such that an N-pole and an S-pole are alternately magnetized in a circumferential direction.

The rotor case 44 may be formed to have a cup-shape to thereby receive the stator 30 therein, and include a rotor hub 45 and a magnet coupling part 46.

The rotor hub 45 may be press-fitted to an upper end portion of the shaft 11 to be fixedly fastened thereto, and may be curvedly formed to an upper side of an axial direction in order to maintain an extracting force with the shaft 11. Also, a chucking mechanism 48 where the disc (D) is plated may be coupled to an outer circumferential surface of the rotor hub 45.

The magnet coupling part 46 may be a portion to which the magnet 42 is fastened, and may be formed along an inner circumferential surface of the rotor case 44. In this instance, the magnet 42 may be disposed to face the core 32 on which the winding coil 34 is wound. Accordingly, when power is applied to the winding coil 34, the rotor 40 may be rotated by electromagnetic interaction between the magnet 42 and the winding coil 34. In addition, by the rotation of the rotor 40, the shaft 11 and the chucking mechanism 48 which are fastened to the rotor case 44 may be accordingly rotated.

The bearing assembly 10 may be used to support the shaft 11 to be rotatable, and include a sleeve 13 and the sleeve holder 20.

In order to prevent the shaft 11 from being separated from the sleeve 13 due to a high speed-rotation of the rotor case 44, which will be described later, the shaft 11 according to the present exemplary embodiment may include a stopper ring-fastening groove 12 into which a stopper ring 72 is inserted, formed in a lower end portion of the shaft 11.

The shaft 11 may be inserted into a hole formed in an inside of the sleeve 13, which may be a rotation supporting member that may support the shaft 11 while forming an oil film formed between the sleeve 13 and the shaft 11 to enable the shaft 11 to be readily rotated, and act as a bearing. An outer circumferential surface of the sleeve 13 may be press-fitted to and fixed to an inside of the sleeve holder 20, which will be described later.

The sleeve holder 20 may be a fixed structure that may support the shaft 11 to be rotatable inside the sleeve holder 20, and may support the shaft 11 to be rotatable using the sleeve 13 as a mediator.

The sleeve holder 20 according to the present exemplary embodiment may be formed to have a cylindrical shape, and may include a body part 22, an extension part 24 extended from the body part 22, and a flange part 25 protruded from a lower end portion of the extension part 24 so as to make a surface contact with an upper surface of the base plate 50.

The sleeve 13 may be inserted into and fastened to the body part 22.

The extension part 24 may be protruded in an outer diameter direction in such a manner that an outer diameter is extended along the outer circumferential surface of the body part 22. Also, a horizontal plane that is horizontally extended from the outer circumferential surface of the body part 22 in the outer diameter direction by the extension part 24 may be formed as the stator seating part 23.

Meanwhile, the outer diameter of the extension part 24 according to the present exemplary embodiment may be extended to the flange part 25. Accordingly, an inner space ranging from the extension part 24 to the flange part 25 may be formed to have a cylindrical shape extended wider than the body part 22.

The stator seating part 23 formed by the extension part 24 may be used as a portion where the stator 30, which will be described later, is seated and fixedly fastened. Also, the inner space extended by the extension part 24 may be used as a space where a thrust plate 70 and a stopper ring 72, which will be described later, may be received, or the base plate 50 may be inserted and fastened.

The flange part 25 may be protruded from a lower end portion of the extension part 24 in an outer diameter direction by a predetermined distance, and may be fastened to the base plate 50 so as to make a surface contact with an upper surface of the base plate 50.

The sleeve holder 20 according to the present exemplary embodiment may be formed by applying pressing work to an iron plate, which is different from a conventional brass plate, or by applying injection molding thereto. Accordingly, a manufacturing process may be more readily realized with relatively low costs.

The base plate 50 may be a support member supporting other components of the motor 100 as a whole, and the above described sleeve holder 20 and the circuit board 60, which will be described later, may be fixedly fastened to a surface, that is, an upper surface of the base plate 50.

According to the present invention, the base plate 50 may be integrally formed, including a conventional supporting plate, and the sleeve holder 20 may be fastened to the upper surface of the base plate 50.

For this, the base plate 50 according to the present exemplary embodiment may include at least one protrusion supporting part 52 formed therein, and a receiving part 54 formed by the protrusion supporting part 52.

Meanwhile, the base plate 50 according to the present exemplary embodiment may be formed of a single consecutive plate. That is, it may be characterized in that the base plate 50 according to the present exemplary embodiment may form both the protrusion supporting part 52 and the receiving part 54, which will be described later, by applying curving work (or pressing work) to a single plate.

The protrusion supporting part 52 may be protruded from a surface, that is, the upper surface of the base plate 50 by the predetermined distance. The protrusion supporting part 52 according to the present exemplary embodiment may be inserted into the extension part 24 of the sleeve holder 20 when the sleeve holder 20 is fastened to the base plate 50. Accordingly, the protrusion supporting part 52 may be formed to have a size and a shape corresponding to an inner circumferential surface of the extension part 24 of the sleeve holder 20, and more specifically, may be formed to have an annular shape consecutively protruded from a position corresponding to an inner circumferential surface of the sleeve holder 20 as shown in FIG. 3.

When the sleeve holder 20 is fastened to the base plate 50, an outer circumferential surface of the protrusion supporting part 52 may be fastened to the sleeve holder 20 in such a manner as to be brought into contact with the inner circumferential surface of the extension part 24 of the sleeve holder 20. Also, a top surface of the protrusion supporting part 52 may support the sleeve holder 20 in such a manner as to be brought into contact with an inner surface of the stator seating part 23 of the sleeve holder 20. Accordingly, the top surface of the protrusion supporting part 52 may be formed to have an area similar to that of the inner surface of the stator seating part 23.

The receiving part 54 may be formed by the protrusion supporting part 52, and formed to have a recess shape. Accordingly, the base plate 50 according to the present exemplary embodiment may include a supporting plate itself, and therefore a conventional separate supporting plate for supporting a lower end of the shaft may not be required.

The receiving part 54 according to the present exemplary embodiment may include a stepped part 55 curvedly formed from an inner circumferential surface of the protrusion supporting part 52, and a thrust groove 56.

The stepped part 55 may be horizontally protruded from a side wall of the receiving part 54 in a direction (that is, inner diameter direction) in which an outer diameter is reduced, and a stopper ring 72, which will be described later, may be seated on an upper surface of the stepped part 55. Also, as for the stepped part 55, a vertical distance from the top surface of the protrusion supporting part 52 to a top surface of the stepped part 55 may be a distance corresponding to a thickness of the stopper ring 72.

The thrust groove 56 may be formed in a center portion of the stepped part 55, and may be used as a space in which the thrust plate 70, which will be described later, is received. Accordingly, the thrust groove 56 may be formed to have a size in which the thrust plate 70 is received.

The base plate 50 according to the present exemplary embodiment configured as above may be made of a metal material. In particular, the base plate 50 may be made of a steel material, and may be manufactured by applying curving work or pressing work to a single metal plate as described above; however, the present invention is not limited thereto.

Thus, the base plate 50 may be manufactured by various schemes such as through injection molding, and the like.

The stopper ring 72 may be interposed between the sleeve 13 and the stepped part 55, and may be partially protruded to an inside of the stopper ring-fastening groove 12 to prevent the shaft 11 from being lifted at the time of rotation of the rotor 40.

The thrust plate 70 may be inserted in the thrust groove 56 formed on the base plate 50, and an upper surface of the thrust plate 70 may support the shaft 11 in such a manner as to be brought into contact with a lower end of the shaft 11.

The circuit board 60 may be fastened to the base plate 50 over the entire upper surface of the base plate 50. The circuit board 60 may include a circuit pattern (not shown) applying power to the motor 100 formed therein, and may be electrically connected to the winding coil 34 of the rotor 40 to thereby apply power to the winding coil 34. Also, a ground pattern among the circuit patterns of the circuit board 60 may be formed to be in electrical conduction connection with the base plate 50. As the circuit board 60, various boards such as a general printed circuit board (PCB), a flexible PCB, and the like may be selectively used, as necessary.

In the motor 100 according to the present exemplary embodiment configured as above, the sleeve holder 20 may be fastened to the base plate 50 in such a manner that the flange part 25 formed in a lower surface of the sleeve holder 20 may be brought into surface contact with a bottom surface of the base plate 50. Also, in order that the inner circumferential surface of the extension part 24 of the sleeve holder 20 and the inner surface of the stator seating part 23 are respectively brought into contact with the outer circumferential surface of the protrusion supporting part 52 and the top surface thereof, the sleeve holder 20 may be fastened to the base plate 50.

Accordingly, in the motor 100 according to the present exemplary embodiment, since the sleeve holder 20 may be brought into contact with and bonded to the base plate 50 using a wide area including the lower surface of the flange part 25, the inner circumferential surface of the extension part 24, and the inner surface of the stator seating part 23, the sleeve holder 20 may be more securely fastened to the base plate 50.

Meanwhile, in the sleeve holder 20 according to the present exemplary embodiment, the protrusion supporting part 52 may be inserted into the sleeve holder 20. Accordingly, the protrusion supporting part 52 may be configured to be press-fitted to an inside of the sleeve holder 20, so that the sleeve holder 20 may be fastened to the base plate 50 by the press-fitting; however, the present invention is not limited thereto. Thus, the sleeve holder 20 may be fixed fastened to the base plate 50 in various manners.

For example, the sleeve holder 20 may be bonded to the base plate 50 using an adhesive or laser welding. These fixing fastening schemes will be described in detail through exemplary embodiments which will be described later.

The motor according to the following exemplary embodiments may be configured to have a structure similar to that of the motor 100 of FIG. 1 according to the above described exemplary embodiment, and a difference therebetween may be shown only in a structure and coupling scheme of the base plate and the sleeve holder. Accordingly, the same reference numerals may be used with respect to the same components, and detailed descriptions of the same components will be omitted. Thus, further descriptions will be made focusing on the structure and coupling scheme of the base plate and the sleeve holder.

Figure 4:
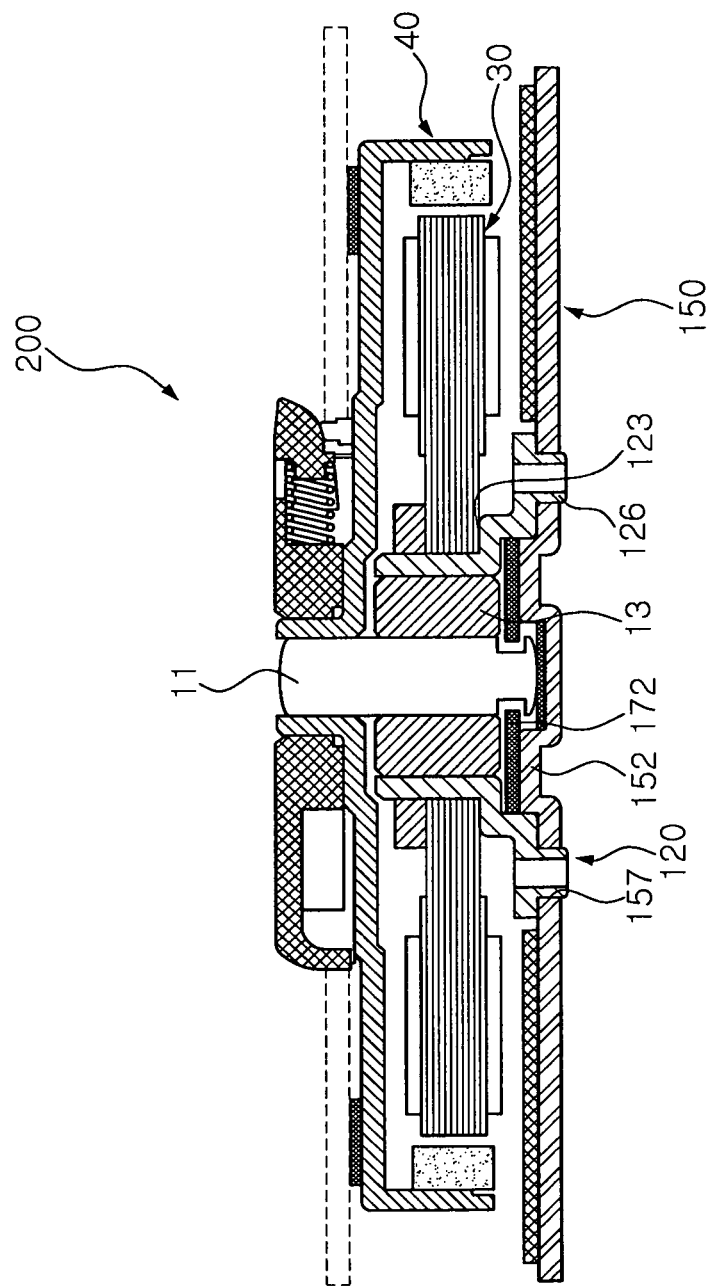
FIG. 4 is a schematic cross-sectional view showing a motor according to another exemplary embodiment of the present invention.
Figure 5:
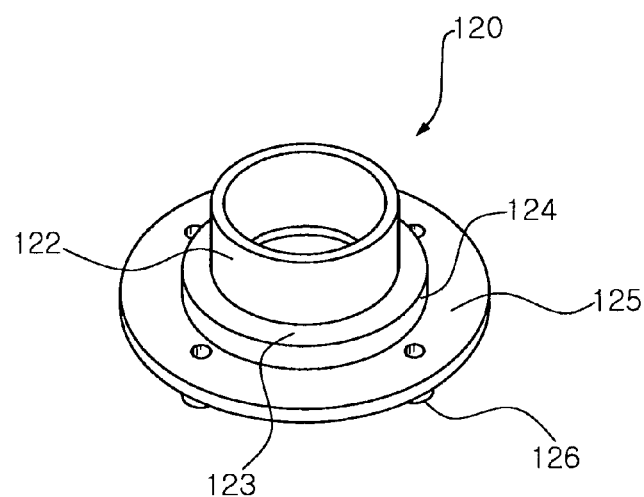
FIG. 5 is a perspective view showing a sleeve holder of FIG. 4.
Figure 6:
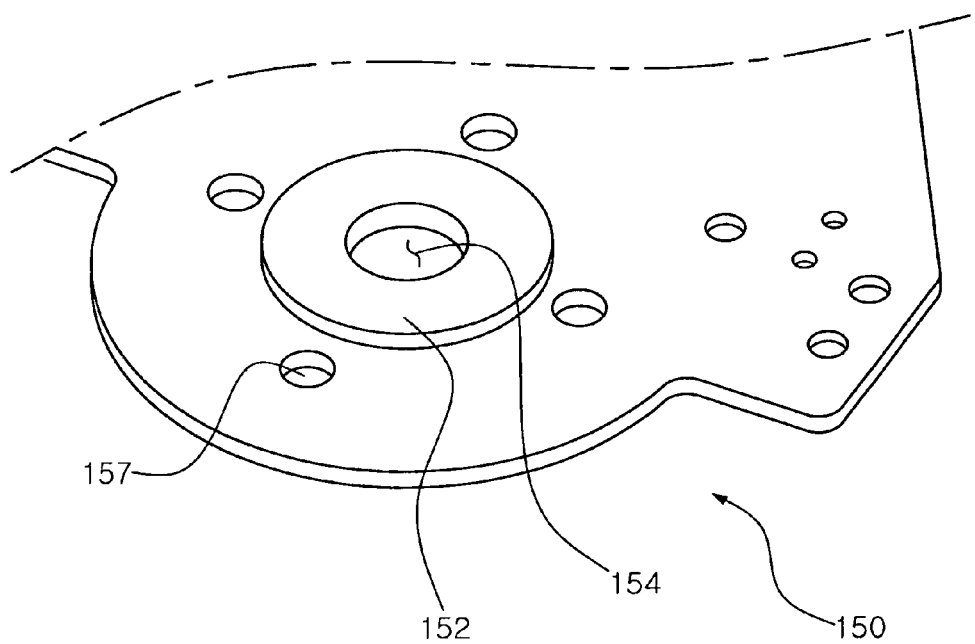
FIG. 6 is a perspective view showing of a base plate of FIG. 4.

FIG. 4 is a schematic cross-sectional view showing a motor according to another exemplary embodiment of the present invention, FIG. 5 is a perspective view showing a sleeve holder of FIG. 4, and FIG. 6 is a perspective view showing of a base plate of FIG. 4.

Referring to FIGS. 4 to 6, a base plate 150 of a motor 200 according to the present exemplary embodiment may be configured similar to the base plate 50 of FIG. 1; however, a difference therebetween may be shown in not including the stepped part 55 of FIG. 1.

More specifically, the base plate 150 according to the present exemplary embodiment may include a protrusion supporting part 152 and a receiving part 154 formed by the protrusion supporting part 152.

A top surface of the protrusion supporting part 152 may be formed as being wider than that of the base plate 50 of FIG. 1. The receiving part 154 may only include the thrust groove 56 of FIG. 1 without including the stepped part 55 of FIG. 1.

Also, the base plate 150 according to the present exemplary embodiment may include at least one insertion hole 157 formed on a position thereof that is brought into contact with a flange part 125 when the base plate 150 is fastened to the sleeve holder 120. The insertion hole 157 may be used as a portion in which a protrusion part 126 of the sleeve holder 120, which will be described later, is inserted. Accordingly, the insertion hole 157 according to the present exemplary embodiment may be formed to correspond to a position and the number of the protrusion parts 126 formed on the flange part 125 of the sleeve holder 120.

The sleeve holder 120 according to the present exemplary embodiment may include a body part 122, an extension part 124, and a flange part 125 in a manner similar to that of the above described exemplary embodiment.

The flange part 125 according to the present exemplary embodiment may include at least one protrusion part 126 formed therein. The protrusion part 126 may be protruded from a surface of the flange part 125, that is, a lower surface of the flange part 125 facing the base plate 150 by a predetermined distance. Accordingly, the protrusion part 126 may be protruded from a position corresponding to a position of an insertion hole 157, and may be formed to have a size corresponding to the insertion hole 157. Also, the protrusion part 126 may be protruded to have a length similar to a thickness of the base plate 150.

The motor 200 according to the present exemplary embodiment may be characterized in that the protrusion part 126 may be inserted into the insertion hole 157 formed on the base plate 150, and the sleeve holder 120 may be fixedly fastened to the base plate 150. In this instance, in order to enhance an adhesive force between the sleeve holder 120 and the base plate 150, the protrusion part 126 may be press-fitted to and inserted into the insertion hole 157.

The protrusion part 126 according to the present exemplary embodiment may be formed through burring work or pressing work. Accordingly, an inside of the protrusion part 126 may be formed to have a hollow cylindrical shape.

In addition, in the motor 100 according to the present exemplary embodiment, a stopper ring 172 may be seated on a top surface of the protrusion supporting part 152. Accordingly, the stopper ring 172 according to the present exemplary embodiment may be interposed between the sleeve 13 and the protrusion supporting part 152.

Accordingly, when the flange part 125 is fastened to the sleeve holder 120, an inner surface of the stator seating part 123 of the sleeve holder 120 may be brought into contact with a top surface of the stopper ring 172, different from a top surface of the protrusion supporting part 152, and the sleeve holder 120 may be fastened to the base plate 150 in such a manner as to be brought into contact with the base plate 150 through an area including a part of an inner circumferential surface of the extension part 124 and a lower surface of the flange part 125.

Meanwhile, the protrusion part 126 of the motor 200 according to the present exemplary embodiment is not limited to a shape illustrated in FIG. 4, and may be configured to have a shape in various manners.

Figure 7:
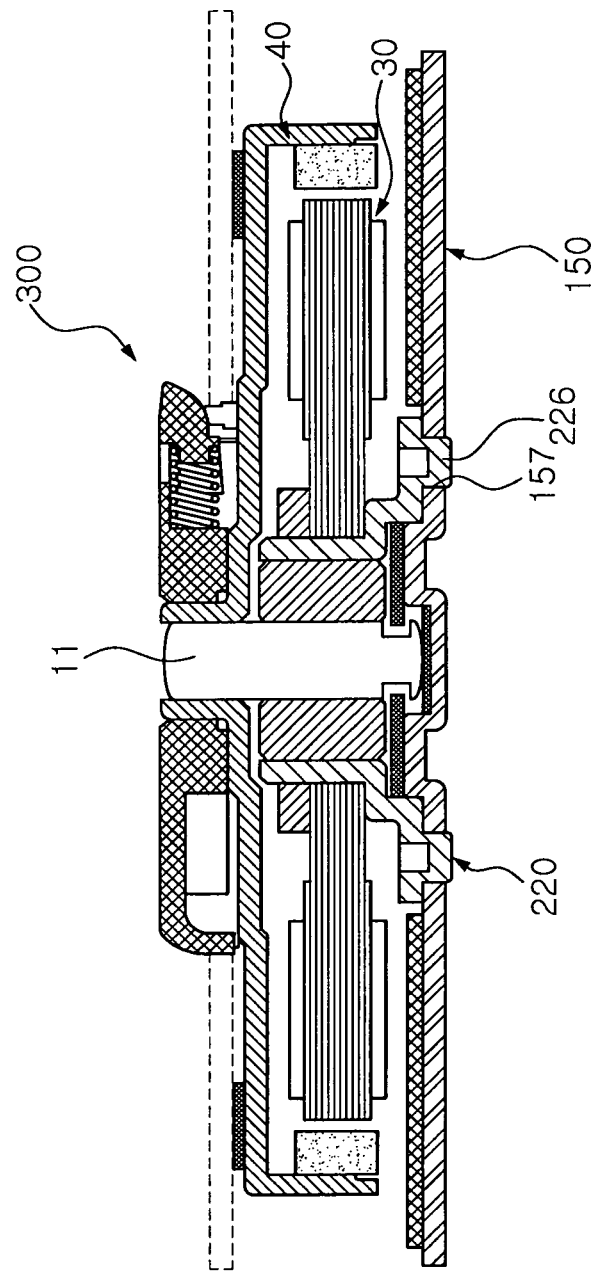
FIG. 7 is a schematic cross-sectional view showing a motor according to another exemplary embodiment of the present invention.

FIG. 7 is a schematic cross-sectional view showing a motor according to another exemplary embodiment of the present invention. Referring to FIG. 7, a motor 300 according to the present exemplary embodiment may be configured similar to the motor 200 of FIG. 4, and a difference therebetween may be shown only in a structure of the protrusion part of the sleeve holder.

More specifically, a protrusion part 226 of the sleeve holder 220 according to the present exemplary embodiment may be formed to have a cylindrical shape having a closed lower end portion. The protrusion part 226 may be formed through pressing work.

In the motors 200 and 300 (hereinafter, referred to as the motor of FIG. 4) according to the present exemplary embodiments in which the sleeve holders 120 and 220 include the protrusion parts 126 and 226, the sleeve holder 120 may be fastened to the base plate 150 in such a manner that the protrusion part 126 formed in the sleeve holder 120 may be inserted into the insertion hole 157 formed on the base plate 150. In particular, since the protrusion part 126 may be press-fitted to and fastened to the insertion hole 157, the sleeve holder 120 may be more readily fastened to the base plate 150.

Meanwhile, the motor 200 according to the present exemplary embodiment may not limited to the fastening scheme in which the protrusion part 126 of the sleeve holder 120 may be press-fitted to the insertion hole 157 of the base plate 150. That is, the sleeve holder 120 may be fastened to the base plate 150 using a fixing-fastening scheme such as adhesion, welding, or the like. In addition, using a combination of a plurality of fastening schemes different from a single fastening scheme, an adhesive force between the sleeve holder 120 and the base plate 150 may be enhanced.

Here, when using the fixing-fastening scheme such as the adhesion, welding, or the like, in the motor 100 according to the present exemplary embodiment, the lower surface of the flange part 125 and a part of the inner circumferential surface of the extension part 124 in which the sleeve holder 120 and the base plate 150 are brought into surface contact with each other may be used as an adhesive surface, and a contact portion between the protrusion part 126 and the insertion hole 157 may be used as the adhesive surface.

Figure 8:
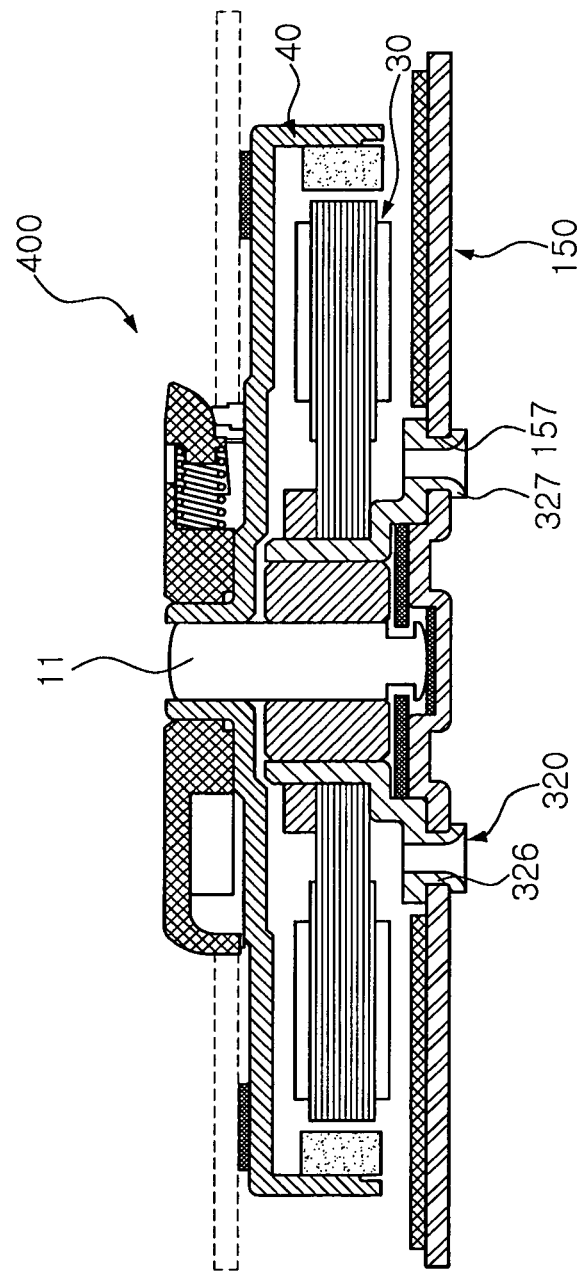
FIG. 8 is a schematic cross-sectional view showing a motor according to another exemplary embodiment of the present invention.

FIG. 8 is a schematic cross-sectional view showing a motor according to another exemplary embodiment of the present invention.

Referring to FIG. 8, a motor 400 according to the present exemplary embodiment may be configured similar to the motor 200 of FIG. 4, and a difference therebetween may be shown only in a fastening structure of the protrusion part.

In the motor 400 according to the present exemplary embodiment, a sleeve holder 320 according to the present exemplary embodiment may include an expansion part 327 formed such that an end of a protrusion part 326 inserted into the insertion hole 157 of the base plate 150 is curved in an outer diameter direction. The expansion part 327 may be formed such that the cylindrical shaped protrusion part 326 may be inserted into the insertion hole 157 of the base plate 150, and then the end of the protrusion part 326 may be curved by being processed in a scheme such as spinning, caulking or the like.

In this case, the insertion hole 157 formed on the base plate 150 may be formed as an inclined surface in which an inner circumferential surface of a portion being brought into contact with a lower surface of the base plate 150 is tapered. This may be to ensure that the expansion part 327 formed such that the end of the protrusion part 326 is curved may be readily curved to thereby be fixed to the base plate 150; however, the present invention is not limited to the inclined surface. Thus, various applications such as being formed as a curved surface may be possible.

In the motor 400 according to the present exemplary embodiment configured as above, since the base plate 150 and the sleeve holder 320 may be fastened to each other in such a manner that the expansion part 327 formed in the end of the protrusion part 326 supports the lower surface of the base plate 150, and therefore there is an advantage in that the base plate 150 and the sleeve holder 320 may be significantly securely fastened to each other.

Meanwhile, similar to the above described exemplary embodiment of FIG. 4, the motor 400 according to the present exemplary embodiment is not limited to the fastening scheme using the expansion part 327 of the protrusion part 326, and thus an adhesive force between the sleeve holder 320 and the base plate 150 may be enhanced using a combination of the fastening schemes such as press fitting, adhesion, welding or the like.

Figure 9:
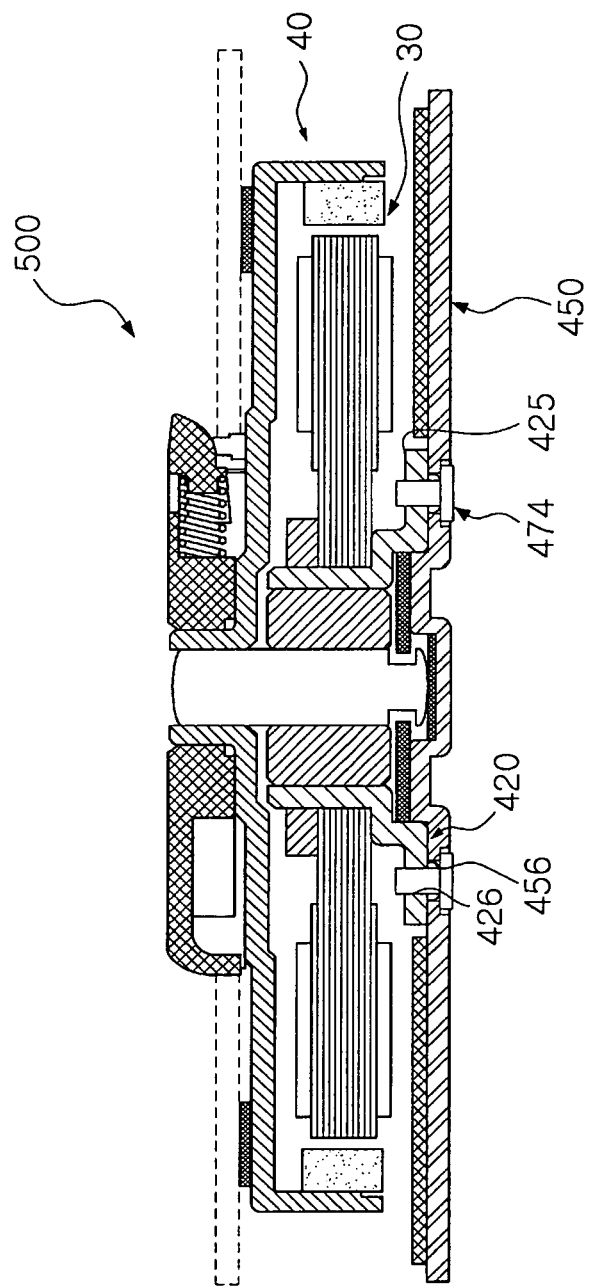
FIG. 9 is a schematic cross-sectional view showing a motor according to another exemplary embodiment of the present invention.

FIG. 9 is a schematic cross-sectional view showing a motor according to another exemplary embodiment of the present invention.

In a motor 500 according to the present exemplary embodiment, the protrusion part 126 of FIG. 4 is not formed on a base plate 450 or a sleeve holder 420 unlike the exemplary embodiments of FIGS. 4 to 8, and the base plate 450 and the sleeve holder 420 may be fastened to each other using a separate fixing member 474.

For this, the base plate 450 and the sleeve holder 420 respectively include insertion holes 426 and 457 formed in a portion in which the protrusion part 126 of FIG. 4 is formed according to the above described exemplary embodiments, and the fixing member 474 according to the present exemplary embodiment may be inserted in such a manner as to pass through the insertion holes 426 and 457 of the base plate 450 and the sleeve holder 420, so that the base plate 450 and the sleeve holder 420 may be fixedly fastened to each other.

As the fixing member 474, a screw or rivet may be used.

When using the screw as the fixing member 474, a thread into which the screw is inserted may be formed on an inner circumferential surface of each of the insertion holes 426 and 457. Also, when using the rivet as the fixing member 474, an end of the rivet inserted into the insertion holes 426 and 457 may be processed using a scheme such as spinning, caulking, or the like, in a manner similar to that of the expansion part 327 of FIG. 7, so that the base plate 450 and the sleeve holder 420 may be fixedly fastened to each other.

Meanwhile, referring to FIG. 9, the insertion hole 457 of the base plate 450 may be formed to have a size larger than that of the insertion hole 457 of the flange part 425, and a case in which a portion partially protruded from the flange part 425 may be inserted into the insertion hole 457 of the base plate 450 is illustrated. In this case, by means of the partially protruded portion, there is an advantage in that the sleeve holder 420 and the base plate 450 may be readily coupled to each other to be arranged; however, the present invention is not limited thereto. Thus, various applications may be possible as long as the base plate 450 and the sleeve holder 420 are fastened to each other using the fixing member 474.

The motor according to the present invention is not limited to the above described exemplary embodiments, and thus various applications thereof may be possible.

For example, according to the above described exemplary embodiment, the protrusion part (126 of FIG. 4) of the sleeve holder may be formed to have the hollow cylindrical shape; however, the present invention is not limited thereto. Thus, it may be possible to form the protrusion part of which a hollow is filled.

Also, according to the above described exemplary embodiments, a case in which the protrusion part 126 is formed on the sleeve holder 120 of FIG. 4 is described. However, conversely, it may be possible that the protrusion part may be formed on the upper surface of the base plate and the insertion hole may be formed in the flange part of the sleeve holder, so that the sleeve holder may be fastened to the base plate.

Figure 10:
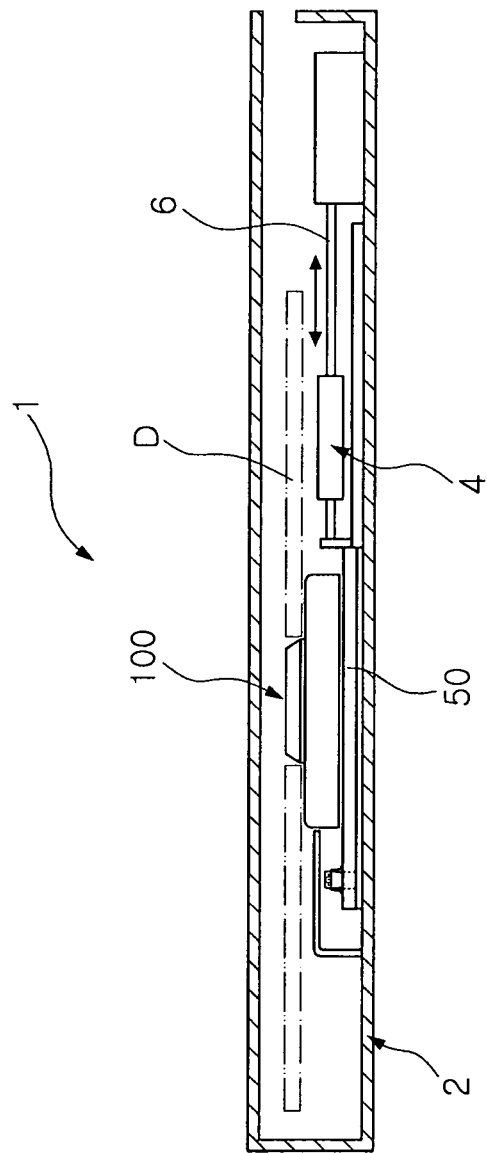
FIG. 10 is a schematic cross-sectional view showing an optical disc drive according to an exemplary embodiment of the present invention.

FIG. 10 is a schematic cross-sectional view showing an optical disc drive according to an exemplary embodiment of the present invention.

Referring to FIG. 10, in an optical disc drive 1 according to the present exemplary embodiment, the motor 100 of FIG. 1 according to the above described exemplary embodiment may be loaded; however, the present invention is not limited thereto. Thus, any one of the motors 100, 200, 300, 400, and 500 according to the above described exemplary embodiments may be loaded.

The optical disc drive 1 according to the present exemplary embodiment may include a frame 2, an optical pick-up device 4, and a movement device 6.

The frame 2 may act as a case of the optical disc drive 1, and the base plate 50 of the motor 100 may be fixed inside the frame 2.

The optical pick-up device 4 may be movably installed in a lower space of a disc (D) placed in the motor 100, and receive data from the disc (D).

The movement device 6 may move the optical pick-up device 4 in a diameter direction of the disc (D) to enable a function of receiving data to be performed over the entire surface of the disc (D).

As set forth, according to exemplary embodiments of the present invention, there are provided the motor and the optical disc drive using the same, which may use the base plate integrated with the supporting plate instead of using the conventional sleeve holder and supporting plate, so that the sleeve holder may be directly fixed to and fastened to the upper surface of the base plate. Accordingly, the number of components of the motor may be relatively reduced in comparison with the related art, thereby realizing cost reduction and process simplification.

Also, according to exemplary embodiments of the present invention, there is provided the motor, which may use the sleeve holder formed by applying press work to an iron plate, instead of using the sleeve holder formed by applying cutting work to a brass plate according to the related art. That is, a small sized sleeve holder may be manufactured in a more simplified process using a material cheaper than the brass, thereby reducing manufacturing costs and manufacturing time of the sleeve holder, and minimizing a size of the motor.

Also, according to exemplary embodiments of the present invention, there is provided the motor, in which the bearing assembly and the base plate may be fixedly fastened to each other in such a manner that the protrusion supporting part of the base plate may be inserted into the bearing assembly, that is, into the sleeve holder. Accordingly, the sleeve holder may be brought into contact with and attached to the base plate in such a manner as to be brought into surface contact with the lower surface of the flange part and the inner circumferential surface of the extension part over a significantly wide area. Accordingly, the sleeve holder may be more securely and stably fastened to the base plate.

Also, according to exemplary embodiments of the present invention, there is provided the motor, in which the flange part of the sleeve holder may be fasted to the base plate in such a manner as to be brought into surface contact with an upper surface of the base plate. In this manner, since the sleeve holder according to exemplary embodiments of the present invention may be brought into contact with and attached to the base plate using a relatively wide area through the flange part, the sleeve holder may be more securely and stably fastened to the base plate.

Also, according to the related art, the base plate and the supporting plate may need to be separately coupled to the sleeve holder, which leads to performing a coupling process twice. However, according to exemplary embodiments of the present invention, a process of coupling the supporting plate to the sleeve holder may be omitted, so that the base plate and the sleeve holder may be coupled to each other only in a single process. Accordingly, a pressure exerted on the sleeve and the base plate may be minimized in the coupling process, and a degree of effects on axial perpendicularity of the motor may be reduced, thereby improving a process yield.

Meanwhile, the motor and the optical disc drive using the same according to the present invention are not limited to the above described exemplary embodiments, and various changes can be made by those skilled in the art within the sprit and scope of the invention.

In addition, according to the above described exemplary embodiments of the present invention, the motor provided in the optical disc drive is described; however, the present invention is not limited thereto. Thus, the motor may be applicable in various manners as long as the motor includes the base plate and the sleeve holder.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor, comprising:
a base plate including a protrusion supporting part protruded upwardly in an axial direction by pressing work, so as to form a receiving part as a recess in an inner side of the protrusion supporting part; and
a sleeve holder including a cylindrical shaped body part to which a cylindrical shaped sleeve is fastened in an inside of the sleeve holder, a stator seating part extending outwardly from a lower end portion of the body part in the radial direction, an extension part extending downwardly from an end portion of the stator seating part in the axial direction and having an outer diameter greater than that of the body part, and a flange part horizontally protruded in an outer diameter direction from a lower end portion of the extension part so as to make a surface contact with an upper surface of the base plate;
a shaft rotatably inserted into the sleeve; and
a thrust plate supporting a lower end portion of the shaft,
wherein the sleeve holder is fastened to the base plate in a state of being seated on the base plate, so as to be disposed on an outer side of the receiving part,
the thrust plate is received in the receiving part formed as the recess in the protrusion supporting part of the base plate, and
the receiving part includes a stepped part vertically protruded from a side wall of the receiving part in a direction in which an outer diameter is reduced, and a thrust groove formed in a center portion of the stepped part having a size corresponding to the thrust plate, the thrust plate being received in the thrust groove.

2. The motor of claim 1, wherein the sleeve holder is fastened to the base plate while a top surface of the protrusion supporting part is brought into contact with an inner surface of the stator seating part.

3. The motor of claim 1, wherein the protrusion supporting part is protruded from the base plate to have an annular shape corresponding to the inner circumferential surface of the extension part.

4. The motor of claim 1, further comprising a stopper ring formed to have a ring shape, and interposed between the sleeve and the protrusion supporting part to prevent the shaft from being lifted.

5. The motor of claim 1, further comprising:
a stopper ring formed to have a ring shape, and interposed between the sleeve and the stepped part to prevent the shaft from being lifted.

6. The motor of claim 5, wherein a vertical distance from the top surface of the protrusion supporting part to a top surface of the stepped part is a distance corresponding to a thickness of the stopper ring.

7. The motor of claim 1, wherein:
the flange part includes at least one protrusion part protruded downwardly from a lower surface of the flange part facing the base plate, the base plate includes at least one insertion hole formed to be positioned to correspond to the protrusion part, and the sleeve holder and the base plate are fixedly fastened to each other in such a manner that the protrusion part is inserted into the insertion hole.

8. The motor of claim 7, wherein the protrusion part is formed through burring work or pressing work.

9. The motor of claim 7, wherein the sleeve holder includes an expansion part formed such that an end of the protrusion part is curved in the outer diameter direction to support a lower surface of the base plate.

10. The motor of claim 1, wherein the sleeve holder and the base plate are fastened to each other using at least one fastening scheme of press fitting, bonding, and welding.

11. The motor of claim 1, further comprising a fixing member passing through both the flange part and the base plate to enable the sleeve holder and the base plate to be fixedly fastened to each other.

12. The motor of claim 11, wherein the fixing member is a screw or a rivet.

13. The motor of claim 1, wherein
the sleeve holder is manufactured by pressing work or injection molding.

14. An optical disc drive, comprising:
a motor of claim 1 and
an optical pick-up device movably installed in a lower space of a disc loaded in the motor, and adapted for receiving data from the disc.

* * * * *